United States Patent [19]

Sterrett

[11] 4,067,716

[45] Jan. 10, 1978

[54] GROWING MEDIUM CONTAINING COMBUSTED BARK PARTICLES

[75] Inventor: Robert Wendell Sterrett, Dunwoody, Ga.

[73] Assignee: W. R. Grace & Co., Cambridge, Mass.

[21] Appl. No.: 772,813

[22] Filed: Feb. 28, 1977

[51] Int. Cl.² ............................................. C05F 11/00
[52] U.S. Cl. ........................................... 71/24; 71/25; 71/64 A; 71/64 R; 71/64 SC; 47/9
[58] Field of Search .................... 71/1, 8, 9, 11, 12, 71/13, 23, 24, 25, 27, 31, 64 A, 64 R, 64 SC, 64 JC; 47/1 R, 1 A, 9, 58; 162/93

[56] References Cited

U.S. PATENT DOCUMENTS

| | | | |
|---|---|---|---|
| 3,607,211 | 9/1971 | Cole et al. | 71/24 X |
| 3,940,257 | 2/1976 | Sherwin et al. | 71/24 X |

FOREIGN PATENT DOCUMENTS

| | | | |
|---|---|---|---|
| 191 | 8/1954 | Philippines | 71/24 |

Primary Examiner—Charles N. Hart
Assistant Examiner—Ferris H. Lander
Attorney, Agent, or Firm—William L. Baker; C. Edward Parker

[57] ABSTRACT

A growing medium for seeds, cuttings, plants and the like contains partially combusted bark particles obtained from bark-burning boiler furnaces of pulp processing concerns. The bark particles possess physical and chemical properties ideally suited for use in growing media, especially so-called "soilless" growing media for container-growing. The combusted bark particles are combined with other materials conventionally utilized in horticultural growing media.

25 Claims, No Drawings

GROWING MEDIUM CONTAINING COMBUSTED BARK PARTICLES

BACKGROUND OF THE INVENTION

This invention relates to a novel growing medium for seeds, plants, etc. More particularly, this invention concerns a novel growing medium for the propagation of seeds, cuttings, plants etc., Containing a product obtained from combusting essentially the bark obtained as a wasteby-product in the processing of logs into useful materials, e.g. pulp for paper products, etc.

With the diminishing availability and/or practicality of good natural soils, the need for economic materials serving to replace all or part of the natural soil component of growing media has become all the greater. Moreover, ordinary soil is often deficient in one or more aspects, requiring the addition of further materials or "amendments" thereto in order to overcome these deficiencies.

It is in the area of container growing in particular that ordinary natural soils are found most often deficient. When seeds, seedlings, cuttings, etc. are grown in pots, trays or other containers, ordinary soils are often found unsuitable as growing media, particularly when such growing is being done on a commercial scale by relatively large growers. Ordinary soil is often too heavy in weight, to little aerated, and lacking in sufficient moisture holding ability. On drying, ordinary natural soil often tends to skrink away from the sides of containers, with the results that water from consequent waterings runs down the sides of the container and out of the drainage holes without complete wetting of the soil. Such drawbacks have obvious undesirable consequences for commercial growers in particular. Excess weight increases handling and transportation costs, and is very undesirable in instances where the container-grown plants are placed upon roofs, patios, etc. of buildings. Shrinkage of the soil results in an undersirable appearance to the ultimate purchaser of the container grown plant and can affect the roots of the plants if great enough. The need for more frequent waterings of insufficiently wetted soils increases costs, and can also be a drawback when the plants are shipped long distances in their containers.

Ideal growing media is well aerated and retentive of moisture, yet at the same time is sufficiently dense to hold seedlings and plants in place. Adequate nutrients need be present for young plantings especially, without high levels of salinity which might damage germinating seeds. The media should also be sterile, that is, free from insects, nematodes and harmful bacteria and fungi.

These requirements have traditionally been met by mixtures of sterilized loam, sand and peat, supplemented by appropriate lime and fertilizer. The so-called "John Innes" composts are of this type. As good natural loam has become scarce, loamless or "soilless" compositions have been developed which are mixtures of sand and peat, expanded vermiculite and peat moss, or such mixtures along with shredded bark, composted bark humus, perlite, etc. Measured amounts of nutrients and trace elements are usually also included.

SUMMARY OF THE INVENTION

In the present invention, ideal media for growing seeds, seedlings, cuttings and plants in general have been found, which media make use of a material prepared by combusting the bark obtained from logs in the processing of such logs into useful cellulosic products. The combusted bark product employed herein is the material in particular which is obtained as the result of combusting in a furnace the bark obtained from logs, the bark having been first reduced to a desired particle size if necessary before entering the furnace. The combusted bark product can be used according to the invention as an "amendment" material to natural soils to improve certain qualities thereof; however, its most advantageous immediate utilization has been found to be in growing media employed especially in container growing, particularly in so-called "soilless" mixes described above which employ only partial or no amounts of natural soil.

Detailed Description Including Preferred Embodiments

The bark product utilized herein is, as aforementioned, obtained as a result of combusting the bark removed from logs, after any necessary size reduction, in a furnace. The product is importantly both economic and available in sufficiently large quantity to be practical since it is produced from bark removed as a waste by-product from timber by large concerns such as lumber and pulp and paper manufacturers who process the de-barked timber into useful products. The bark is used by these concerns as fuel in boiler furnaces used to produce steam for power, etc.

The bark typically is initially produced by a conventional "debarking" operation which removes essentially the outer external covering or "bark" from the timber, although a small amount of the next layer internal of the bark is likely also removed in the rough "de-barking" operations. The bark, if not already of desired size, may be further reduced in size and then fed to the grate of the boiler furnace. The bark as fed to the grate typically has a size of less than about 1 to 2 inches, in some cases about 90% averaging three-fourths inch or less, and contains from about 25 to about 65 percent moisture, typically about 33 to about 58 percent. The bark feed may contain a small percentage of other non-bark wood particles such as scrap wood etc., but in some operations the sized bark feed is essentially free of such materials. Supplemental fuel such as petroleum fuel oil or coal may in some cases be burned with the bark feed.

Air, which may be preheated, is usually always supplied to the furnace and caused to be intimately mixed with the bark particles during combustion. The bark particles may be combusted while dispersed over a grate, or such combustion may take place while the particles are suspended in the combustion air. Combustion temperatures are typically above about 1500° F.

The burning bark in the furnaces produces heated air and hot combustion gases which are caused to exchange heat with water in a well known manner, typically water contained in banks of water tubes which in turn produce the desired steam. As the bark is burned, small particles of partially burned particulate matter are formed. The particles are normally sufficiently light to be suspended in the hot air and combustion gases and even carried along with it. It is these particles of partially combusted bark as collected, for example by baffled hoppers, that are used in the present invention. Since the bark particles are only partially, that is, incompletely combusted, the particles have a residual "b.t.u." value which has led to their previous use in charcoal briquets.

The combusted bark particles in addition to being economic and available in sufficiently large quantities have been found to possess properties which make them especially desirable for use in growing media. The material as produced is light in weight, sterile, and has the fairly even particle size distribution as recovered from the furnace described below, presumably due to the fact that it is combusted in small, particulate form.

Significantly, the combusted bark has been found to possess a high resistance to compaction (good "bulking"), even after wetting. One advantageous result of such a property is that it, or media containing such, resists the undesirable shrinking effect mentioned above, even after wetting and drying. Growing media containing combusted bark particles also appear to possess excellent wettability characteristics. This is in contrast to materials such as peat moss widely used in growing media which must be kept in a moist condition and/or be treated with a wetting agent in order to make it sufficiently wettable upon intermittent waterings. The good wettability characteristics of growing media containing the combusted bark is evidenced by good percolation and good water retention properties even after a period of time. Moreover, the combusted bark appears to possess certain important nutrients available to plants grown therein.

It is feasible that a material consisting entirely of the combusted bark particles can be employed as a growing media for seeds, cuttings, plants, etc. Optimum growing media however are prepared according to the invention wherein the combusted bark material is combined with other materials, particularly other horticultural materials such as have been heretofore employed in growing media. Such "horticultural materials" include those of an organic nature, inorganic nature or mixed organic-inorganic nature, either naturally occurring or synthetically produced. Thus the combusted bark may according to the invention be combined with natural soils e.g. loams and clays; partially or fully decayed organic matter, such as, e.g., peat, including peat moss and humus, composted plant and vegetable matter such as, e.g. composted bark or humus, composted corn stalks, etc., composted manure, etc.; undecayed particulate organic materials such as, e.g., saw dust, shredded or chopped pine bark, corn stalks, redwood shavings, rice hulls, straw, hay and the like; chopped or shredded natural or synthetic resins, such as, e.g., foamed and unfoamed polyethylene, polystyrene, etc.; inorganic aggregate materials such as course and fine sand, lightweight inorganic aggregate such as for example expanded or unexpanded vermiculite, perlite, expanded shale and clays, fly ash, etc., as well as mixtures of any of the forgoing. In such mixtures, the combusted bark may be used in any desired proportion, say from about 10 to about 80 percent by volume, preferably about 30 to about 60 volume percent of the total.

To the combusted bark particles or mixtures of such with the above may be added additional conventional materials such as nutrients, fertilizers, pesticides, nematocides, coloring agents, wetting agents, etc.

As aforementioned it appears that the combusted bark contributes certain nutrient values to the growing plant. However, additional or supplemental nutrients and fertilizers may be those selected to provide one or more of the elements necessary for plant development such as nitrogen, phosphorus, potassium, calcium, sulfur, magnesium, iron, manganese, boron, zinc and copper. Typical of the additives convenient or economical for supplying one or more of such elements are epsom salt (magnesium sulphate), ordinary superphosphate, potassium nitrate, gypsum (calcium sulfate dihydrate), ferrous sulphate, manganese sulphate and boric acid. Also nitrogen may be supplied as calcium nitrate, ammonium nitrate, sodium nitrate, ammonium phosphate, or any other ammonium or nitrate fertilizer salt. Phosphorus might be supplied as triple superphosphate, food-grade mono-calcium phosphate, potassium phosphate or any other potassium fertilizer salt. Calcium may be supplied incidentally with the superphosphates and is added as calcium sulphate. Sulfur may be supplied incidentally with any of the foregoing sulfur containing materials. Iron might be supplied as the tartrate, citrate or oxide. Manganese, copper and zinc might be supplied as borax or other soluble boron salt. Moreover, urea and urea-formaldehyde condensates as well-known fertilizing materials for the supply of nitrogen. Sewage sludge would be another additional nutrient source.

Preferred blends of combusted bark useful as growing media according to the invention comprise mixtures of the combusted bark product with one or more of the following particular components: (a) expanded lightweight aggregate, preferably expanded vermiculite; (b) fibrous organic material such as peat moss, non-combusted bark or non-combusted bark compost of either hardwood or softwood varieties; and (c) densifying aggregate, usually inorganic, such as sand. The expanded lightweight aggregate enhances water retention properties of the mix. Moreover, the preferred expanded lightweight aggregate, vermiculite, contributes nutrient values (potassium and magnesium) and has ion exchange properties to retain soluble nutrient elements present. The fibrous material helps to bond the mix together and impart cohesiveness. Peat moss is preferred although uncomposted milled pine bark will add to long term stability of physical properties. The densifying aggregate or weight additive will typically have a density of at least about 50 lbs./cu. ft. This is included to give sufficient density to the mix to insure that plants will be held firm and not be easily knocked over. The densifying aggregate can also contribute to binding, and improves drainage. Washed quartz sands, generally free from salt, clay and silt are best suited. Course sand having particles generally in the ⅛ to 1/10 inch size range, or finer sands, may be used. Other examples of weight additives include expanded shale, coal ash, etc.

Such preferred mixes preferably contain the combusted bark in an amount ranging between about 10 and about 60 percent by volume. A particularly preferred "soilless" growing medium would contain the combusted bark in the foregoing proportion and further about 20 to about 50 percent by volume of the fibrous organic material, about 10 to about 30 percent by volume of the expanded lightweight aggregate, and about 1 to about 15 percent by volume of the densifying aggregate component. A suitable conventional nutrient material may optionally be added to such mixes to improve the overall nutrients available.

The preferred combusted bark product for use herein is a product produced by a commercial pulp processor who combusts bark in a steam-generating boiler, the process employed being essentially as follows.

Bark obtained from pine logs (75% domestic; 25% from Bahamas) by conventional "debarking" procedures is run through a coarse, rugged sizing apparatus ("hog") and collected in a surge hopper. From there, the sized bark is distributed across a travelling grate of a water tube boiler. The distributor is a rotating paddle type (1800RPM) which flings the bark material over the width and length of the grate which travels toward the distributor. The bark feed is free of wood scraps, process waste or other solid fuels. The feed is less than about 1 inch in size and combustion temperature is in the 1900° to 2200° F. range. Oil is added to the bark however as a supplemental fuel. The use of the oil is constant but the amount varies according to the heat load. In the boiler, combustion air is supplied from beneath the grate. As the bark burns, the partially burned particulate matter remaining is carried upwards in the stream of air and combustion gases, and passes out of the boiler through baffled hoppers. The hoppers contain banks of water tubes which extract heat from the gases to produce steam. The baffles in the hoppers, inter alia, provide direction changes of the hot gases which cause particulate matter to drop out. This combusted particulate bark matter is referred to in the following Examples as "Combusted Bark Product A".

Another combusted bark product, "B", is also used in Examples below. This product is believed to be prepared in a manner similar to that of "A", except that it is burned with particulate coal as a supplemental fuel and is mixed with water as collected from the furnace ("wet-sluiced") and then directed to a settling pond.

The combusted bark products used in the present invention are characterized as aforementioned as very light in weight and as having a particle size distribution which renders such products particularly suited for use in growing media. The combusted bark products generally possess a dry bulk density, that is, "oven-dry" or essentially moisture-free, bulk density of less that about 17, more typically less than about 10 pounds per cubic foot. Ash contents of the bark ash products may vary according to the particular source of processing, but in general will be found to be less than about 55% as calculated below, preferably less than about 25%.

Typical physical properties of the combusted products "A" and "B" are shown in Table I. For comparison, the same properties for activated and inactivated charcoal samples obtained frm Barneby Cheney Co. are shown. The charcoal products are believed to be of coconut shell origin. The activated product is believed to be prepared by high temperature steam treatment of the inactivated product.

The properties tested for in Table I included: Moisture Content — calculated by weighing the samples as received and then weighing the sample again after drying the sample overnight (24 hours) at 105° C.; the % moisture shown in Table I is calculated by dividing the loss in weight by the weight of the dried sample and then multipying by 100; Ash Content — the dried sample from the foregoing is ashed at 1200° F. overnight in a muffle furnace; the weight of the heated product (ash) divided by the weight of the dried sample multiplied by 100 gives the ash content; Dry Bulk Density — calculated by placing sample in a cylindrical container calibrated by volume and striking the bottom of the container until the sample settles to a constant volume; the sample is then heated at 105° C. overnight to dry it and the dried weight of the sample obtained per unit of volume is calculated in pounds per cubic foot; Incombustible Residue — is obtained by multipying the bulk density by the factor 0.178 to give ash in pounds per cubic foot; Water Holding Capacity (W.H.C.)— The volume and weight of a 3 1 inch pot having openings in the bottom are first determined and the pot then filled to the brim with samples and weighed ; the weight of the sample in the pot is then calculated by difference and recorded as "$W_1$"; the filled pot is then placed in water in a container, the water level being equal to the height of the brim, and allowed to soak overnight; the pot is then removed and allowed to drain until no water is seen draining from the openings in the pot; the pot is then weighed and the difference in the weight "$W_2$" divided by the dry weight "$W_1$" multiplied by 100 gives the W.H.C. in the % by weight; W.H.C. in % by volume is measured by dividing the volume of the water by the volume of the dry sample multiplied by 100.

TABLE I

|  | Comb. Bark "A" | Comb. Bark "B" | Inact. Charcoal | Act. Charcoal |
|---|---|---|---|---|
| % Moisture | 182.8 | 143.4 | 6.47 | 5.77 |
| % Ash | 17.8 | 53.6 | 13.7 | 1.87 |
| Incomb. Residue (lbs/ft$^3$) | 1.87 | 8.95 | 2.4 | 0.62 |
| W.H.C. (% wt.) | 417.9 | 228.3 | 138.5 | 68.7 |
| W.H.C. (% vol.) | 70.3 | 61.4 | 20.1 | 41.5 |
| Dry Bulk Dens. (lbs./ft$^3$) | 10.5 | 16.8 | 17.5 | 33.1 |

The ability of the combusted bark particles to hold substantially better than 150, even 200, % by weight of water is particularly noteworthy.

In Table II below, the pH and conductance values of the samples of Table I are shown.

TABLE II

| Sample | pH | Conductance |
|---|---|---|
| A | 6.60 | 0.60 |
| B | 7.85 | 0.20 |
| Inact. Charcoal | 7.30 | 0.36 |
| Act. Charcoal | 9.40 | 1.35 |

A seive analysis of the samples of Ex. I are shown in Table III below. The analysis is taken of the samples in their "as received" state, i.e., without initially being dried.

TABLE III

| | SIEVE ANALYSIS | | | |
| | Percent Cumulative Retained | | | |
| U.S. Screen | "A" | "B" | Act. Char. | Inact. Char. |
|---|---|---|---|---|
| ⅜ | 0.6% | 2.0% | 0 | 0 |
| 4 | 3.6% | 10.6% | 0 | 0.7 |
| 8 | 20.2% | 29.1% | 76.8 | 59.8 |
| 16 | 73.0% | 71.8% | 99.7 | 98.8 |
| 30 | 99.5% | 97.6% | 99.8 | 99.2 |
| 50 | 99.8% | 99.3% | 99.9 | 99.3 |
| 100 | 99.9% | 99.8% | 99.9 | 99.4 |
| Pan | 100.0% | 100.0% | 100.0 | 100.0 |

It can be seen from Table III that better than 95% of the combusted bark particles passed a ⅜ screen yet were retained on a No. 100 screen. Also, greater than 50% passed a No. 8, but were retained on a No. 16.

In the sieve analysis shown in Table IV below, the samples were first dried overnight in an oven at 105° C.

TABLE IV

| U.S. Screen | Comb. Prod. "A" | Comb. Prod. "B" |
| --- | --- | --- |
| 4 | 0.5 | 22.0 |
| 8 | 7.5 | 36.0 |
| 20 | 43.5 | 61.0 |
| 50 | 69.5 | 77.0 |
| 100 | 82.5 | 86.0 |
| Pan | 100.0 | 100.0 |

It can be seen from Table IV, that when dried, greater than about 70% of the combusted bark particles pass a No. 4 screen but are retained upon a 100, or even a No. 50. Also, greater than about 80% of the two samples tested in Table IV were retained on a No. 100. The screens used herein are U.S.A. Standard Testing Screens, meeting ASTM E11 specifications.

The invention is further illustrated by the following Examples.

EXAMPLE I

Growing media were prepared containing the following ingredients in the approximate proportions shown (% by volume):

|  | Growing Media A | Growing Media B |
| --- | --- | --- |
| Combusted bark ash product "A" | 25 | 40 |
| Composted hardwood bark (pine could be used) | 15 | 30 |
| Canadian peat moss | 20 | — |
| Expanded vermiculite | 25 | 10 |
| Perlite | 5 | — |
| Sand | 10 | 20 |

Unrooted cuttings were placed in the above two media, and also in a "standard" commercial growing media known prior to this invention and similar in composition "A" except that no combusted bark product is employed, the difference being made up essentially by increased composted bark (about 30%), increased vermiculite and perlite and less sand, based on the total. Observations made of the root systems after five weeks were reported as; plants grown in "A" were "best"; "B" good. Further, the media "A" was observed "to be as good or better" than the standard commercial growing media.

EXAMPLE II

In another example, a growing mix is prepared by first placing 12 cubic feet of sphagnum peat moss in a large blender, followed by 6 cubic feet of combusted bark product "A". To this mixture is then added 6 cubic feet of expanded vermiculite, 2 cubic feet of sand and 3 cubic feet of perlite.

To the resulting blend is then added 5 lbs. of ground limestone, 1 ½ lbs. of calcium nitrate, 2 lbs. of 0-20-0, ½ ounces of fritted trace elements ("FTE 503"), 1 quart of granular wetting agent ("ETHOMID", a polyethoxylated amide), ½ lb. of iron sulfate and 1 lb. of "UFN", a urea-formaldelyde nutrient.

EXAMPLE III

Another growing medium is prepared by blending about 25 to about 50% of combusted bark product "A" with from about 50 to about 75% expanded vermiculite, a "Zonlite" brand No. 3 expanded product having a dry bulk density of about 7.5 lbs./cu.ft.

EXAMPLE IV

An ideal growing medium for plants being grown in large (above about 1 gallon) containers comprises the following:

|  | % |
| --- | --- |
| Combusted bark product A | 29.5–37 |
| Canadian peat moss | 30–37 |
| Expanded vermiculite | 30 |
| Sand | 3–3.5 |

A nutrient composition is added to the above, which in addition to nutrient, contained a wetting agent.

EXAMPLE V

Another container mix is prepared containing the following:

|  | % |
| --- | --- |
| Combusted bark product A | 40 |
| Composted pine bark | 40 |
| Expanded vermiculite | 10 |
| Granite sand | 10 |

To the above is added a nutrient formula at the level of 9 lbs./cu.yd.

Observations after approximately 6 weeks of a pine species grown in 6 inch pots containing the above mix were made. The plants during growing were given typical watering and feeding. The plants were characterized by uniform root development throughout the pots, no puddling during watering, uniform wet-out in the pots and good drainage.

Plantings of "Baby Doll" cuttings in pots containing the mix of this example were made. Observations of excellent uniform root development and beautiful color development were made after about six weeks. Also, near zero loss of lower leaves of the plants was noticed. Boston fern were also satisfactorily grown in mixes of this Example.

EXAMPLE VI

Several growing media mixes according to the invention were formulated using combusted bark product "B" previously described. The formulations were approximately as shown in Table V. The proportions shown of each component are, again, percent by volume, based on the total. Additionally 1.34 lbs. of identical nutrient were added to each of the batches numbered 1 to 5.

TABLE V

| Mix Component | BATCH NUMBER 1 | 2 | 3 | 4 | 5 |
| --- | --- | --- | --- | --- | --- |
| Combusted bark "B" | 60 | 45 | 40 | 45 | 30 |
| Non-composted Pine bark | 20 | — | 20 | — | 30 |
| Ex. vermiculite | 10 | 15 | 10 | 15 | 15 |
| Sand | 10 | 10 | 10 | 10 | 5 |
| Canadian peat moss | — | 30 | 20 | — | 20 |
| Fla. peat moss | — | — | — | 30 | — |

The physical properties of the mixes shown in Table V were tested, including (a) density; (b) wettability; (c) % moisture; (d) ph; (e) salinity; and (f) percolation. Table VI shows the results of such tests for the batches 1–5, and, in addition the mix of Example IV and two popular "soilless" mixes, "X" and "Y". Mix "X" contained approximately 32% composted pine bark, 20% Canadian peat moss, 32% vermiculite, 4% sand and 12% perlite. Mix "Y" contained approximately 50% Canadian peat moss and 50% expanded vermiculite, all percentages being by volume. While the batches 1–5 had an identical nutrient charge, each of the nutrient charges added to mixes "X", "Y" and Example IV differed from that of batches 1–5, as well as from one another. These differences however do not significantly alter the physicals tested for.

TABLE VI

| PHYSICAL PROPERTY | BATCH NO. | | | | | Ex. IV | X | Y |
|---|---|---|---|---|---|---|---|---|
| | 1 | 2 | 3 | 4 | 5 | | | |
| Density | 29.7 | 24.5 | 24.6 | 34.8 | 27.03 | 16.7 | 18.5 | 8.5 |
| Wettability | 21.9 | 36.7 | 18.6 | 22.2 | 21.2 | 43 | 30 | 36 |
| % Moisture | 41.1 | 31.3 | 36.2 | 41.2 | 56.2 | 41 | 30 | 30 |
| Salinity | 0.80 | 1.05 | 0.85 | 0.70 | 1 | 1.1 | 0.9 | 5 |
| pH | 6.25 | 6.45 | 6.65 | 6.4 | 6.25 | 6.5 | 5.1 | 1.5 |
| PERCOLATION[1] | | | | | | | | |
| M.P.U. gm/gm | 0.5 | 0.93 | 0.75 | 0.4 | 1.08 | — | 117 | 3.3 |
| Initial-Sec. | 17.5 | 26.5 | 13.5 | 34.5 | 11.5 | 25 | 44 | 30 |
| Final Sec. | 90 | 79 | 34.5 | 432 | 29.5 | 64 | 85 | 60 |
| PERCOLATION[2] | | | | | | | | |
| M.P.U. gm/gm | 0.5 | 1.05 | 0.81 | 0.46 | 1.15 | 2.6 | — | — |
| Initial-Sec. | 5 | 7 | 4.3 | 3 | 6 | 10 | 20 | 15 |
| H$_2$O used-ml | 344 | 324 | 412 | 319 | 438 | — | 270 | 330 |
| % Retain H$_2$O/Vol. | 25.1 | 39.5 | 33.3 | 22.8 | 35.8 | 46.5 | 44 | 50 |
| Wet Out % | Total | Total | Total | Total | Total | Total | Total | Total |

[1]Test Procedure "A"
[2]Test Procedure "B"

The physical properties tested in Table VI are among those considered significant in evaluating growing media, although there are no generally accepted standards in this area.

A good bulk density of a finished mix is considered to be one which is great enough to hold a plant firmly enough, yet not too heavy to be a handling problem for growers. In this regard the bulk densities of the batch mixes 1–5 might be considered "high" as presenting a handling problem, yet this is obviously subjective. The mix "X" and that of Example IV would be more easily handled, while the "Y" mix with a density of about 8.5 might prove incapable of holding large plants therein under certain conditions.

The pH value of growing media is important to the growth of plants therein. Generally a pH of about 6 is desirable from this standpoint as good nutrient release is promoted, etc., at this level.

Wettability is essentially a measure of the "wickability" of the mix, that is, the ability of the mix to draw water from below. The amount of water in grams wicked-up in a given time period is shown in the Table.

The "percolation" of the mixes in Table IV was tested using two different procedures. Percolation as tested herein is essentially a measure of the ability of the mix to pass water introduced from above downwardly through the mix. The time for such passage of given amount of water is shown in the Table. "M.P.U." is a measure of the amount of moisture picked-up, grams of water over grams of mix material, during the percolation test. "Wet-out" is a subjective determination made by observing a sample of the percolated material spread out. "Wet-out" is "total" if the entirety of the mix appears wet. Test results of "wettability" and "percolation" give an evaluation of the wetting characteristics of the mix.

Batch mix No. 4 had poor percolation test values. It demonstrated the undersirable characteristic of being easily compacted (difference between initial and final percolation times of 397.5 seconds). In a less stringent test (percolation test procedure "B") all batches 1–5 had a similar compaction test values. Batch Nos. 1, 2 and 3 moreover showed evidence of (1) material erosion during watering and (2) collapse of surface structure during visual evaluation. Further, batches 1 and 4 had poor moisture retentions (percent retained by volume) as compared to the conventional mixes "X" and "Y", Generally, only mix No. 4 might be considered rejectable as a commercial media since it evidenced compaction tendencies, although it wetted out totally. Moreover, the mix containing the larger quantity of combusted bark and no peat moss (batch No. 1) did not appear to stay together after watering.

Evaluation of growth response of plants in growing media is difficult because of its highly subjective nature. However, observations were made of the growth response of a sensitive and difficult-to-grow species, poinsettias, in the mixes of Table IV. In addition to being subjective, the results of the observations was complicated by the differences in composition, the precise nutrient charges, etc. However, the following conclusions were drawn:

a. No evidence of toxicity in any of the mixes;
b. Growth response of all mixes could be considered at least satisfactory; and
c. Consensus order of growth response was: Conventional mix "Y" and mix of Example IV were best; Batch Nos. 2, 3, 5, 1, and 4 in descending order of achievement were next, followed by conventional mix "X" as worst.

EXAMPLE VII

It is very desirable that growing media exhibit not only good wetting characteristic initially, that is upon the first watering, but that this good wetting characteristic be retained with the passage of time. The wetting characteristics of growing media are, as pointed out previously, evaluated herein by measurements of wettability or "wickability" of water from beneath the mix, and also by the percolation rate of water introduced from above through the mix.

In this example, the wetting characteristics, with the passage of time, of the composition of the invention as essentially set forth in Example IV is tested by taking measurements on a weekly time basis of bulk density, wettability, % moisture and percolation rate (Procedure "B") in the previous Example. For comparison, the same physicals of the standard commercial media "X" and "Y" of the previous Example were similarly tested. It should be noted that all three test samples contained a small percentage of a commercial wetting agent.

The materials to be tested were placed in moisture tight bags and were sealed tight after each test. Each was maintained in this condition until the next test. Measurements were taken of fresh samples from each bag on a weekly basis for ten weeks. The following is a list of observations and conclusions derived from an evaluation of the materials over the 10 week test period:

1. The data gathered showed that ideally the amount of moisture contained in all three mixes did not change significantly over the 10 week period.
2. The data gathered showed that over the 10 week period, the "wettability", or essentially the ability of the mix to "wick" water from below decreased significantly for the standard commercial mixes "X" and "Y", but remained relatively constant for the mix of the invention formulated with combusted bark as in Example IV.
3. The data further showed that over the ten weeks test period the percolation time increased significantly for the "X" and "Y" mixes, but remained essentially constant for the mix of Example IV.
4. The results mentioned in (2) and (3) evidence the highly desirable stability of the wetting characteristics of the combusted bark-containing mix of Example IV over a ten week period of time.

EXAMPLE VIII

Samples of the combusted bark product "A" used in the previous Examples were analyzed for soil fertility by an independent laboratory. Soil fertility analysis data obtained by extraction characterize the nutritive function of a component of, or of a growing media, and gives a numerical representation of the important elements present and available for plant growth.

In Table VII, extraction test values for various materials including two different samples of combusted bark products "A" and one of "B" previously described. In addition, results of the same test on ashes generated from a coal burning steam boiler, "Coal-Ash # 1" which was obtained from Peoria, Ill., and another coal ash, "#2", obtained from Ontario Hydro were tested. Further included are results of the same extraction tests on composted pine bark and the standard commercial mix "X" of a previous example. Tests for the following were reported in the Table VII; half saturation %; pH; salinity; nitrate nitrogen; ammoniacal nitrogen; phosphate phosphorous; potassium; calcium and magnesium, also included in the table are test results on the charcoal of Table I.

characteristics to growing media, have these nutrients available to plants grown therein. The fact that combusted product "B" had less phosphorous, potassium and magnesium is believed due to the allowance of the dry combusted bark from the furnace to set for some time in a cooling pond.

It is claimed:
1. A growing medium for seeds, cuttings, plants and the like comprising combusted bark particles in admixture with at least one additional horticultural material, the said bark particles being the product obtained by partially combusting essentially the bark, in particulate form, removed from logs in a furnace.
2. The growing medium of claim 1 wherein said bark particles possess a dry bulk density of less than about 17 pounds per cubic foot.
3. The growing medium of claim 1 wherein said bark particles exhibit a particle size substantially such that better than about 70 percent of the particles pass a No. 4 U.S. screen, but are retained on a 100 U.S. screen.
4. The growing medium of claim 1 wherein the amount of said bark particles present in said growing medium ranges between about 10 and about 80 percent by volume.
5. The growing medium of claim 4 wherein said amount is between about 30 and about 60 percent by volume.
6. The growing medium of claim 1 wherein said horticultural material is of organic, inorganic, or mixed organic-inorganic nature.
7. The growing medium of claim 6 wherein said horticultural material is selected from the group consisting of natural soils, partially or fully decayed organic matter, undecayed particulate organic matter, natural or synthetic resins in particulate form, inorganic particulate materials, and mixtures of such.
8. The growing medium of claim 1 wherein said horticultural material is selected from the group consisting of peat moss, non-combusted bark, expanded vermiculite, sand, or mixtures of such.
9. The growing medium of claim 1 to which is added a nutrient-containing material.
10. A growing medium for seeds, cuttings, plants and the like comprising from about 10 to about 80 percent by volume of combusted bark particles in admixture with a horticultural material selected from the group consisting of natural soils, partially or fully decayed organic matter, undecayed particulate organic matter, natural or synthetic resins in particulate form, and mixtures thereof, said bark particles being the product recovered from the flue gases produced in a boiler fur-

TABLE VII

|  | Half Sat. % | pH | Sal. EC×10$^{-3}$ | Nit. N. | Amm. N. | Phos. P. | K | Ca | Mg |
|---|---|---|---|---|---|---|---|---|---|
| Comb. bark "A" | 202 | 8 | 2.5 | 49 | 18 | 200 | 2200 | 14520 | 1065 |
| Comb. bark "A" | 122 | 8.4 | 4.4 | 27 | 7 | 200 | 3800 | 15960 | 1130 |
| Comb. bark "B" | 140 | 8.1 | 1.4 | 85 | 46 | 60 | 732 | 18000 | 405 |
| Coal ash #1 | 36 | 6.6 | 6.2 | 272 | 8 | 9 | 372 | 15780 | 81 |
| Coal ash #2 | 22 | 6.5 | 2.4 | 3 | 2 | 5 | 26 | 1717 | 108 |
| Comp. pine bark | 100 | 3.8 | 0.3 | 22 | 11 | 90 | 800 | 1600 | 270 |
| Mix "X" | 100 | 5.5 | 2 | 100 | 150 | 150 | 750 | 4500 | 1800 |
| Act. Charcoal | 57 | 11 | 9.3 | 13 | 2 | 35 | 4250 | 350 | 35 |
| Inact. Charcoal | 90 | 8.5 | 1.2 | 21 | 4 | 18 | 366 | 2560 | 65 |

The date shown in Table VII evidences the comparatively high amounts of four elements important for plant growth: Phosphorous, potassium, magnesium and calcium, indicating that the combusted bark products of the invention in addition to imparting desirable physical nace during the partial combustion of essentially bark removed from logs, the bark being combusted while in the form of particles of less than about 1 to 2 inches in size.

11. The growing medium of claim 10 wherein said combusted bark particles have a dry density of less than about 17 pounds per cubic foot and a particles size substantially such that better than about 70 percent of the particles pass a No. 4 U.S. screen, but are retained on a 100 U.S. screen.

12. The growing medium of claim 1 wherein said horticultural material is selected from the group consisting of composted non-combusted bark, non-composted non-combusted bark, peat moss, expanded vermiculite, perlite, sand, or mixtures of such.

13. A growing medium especially suited for growing seeds, cuttings, plants and the like in containers, said medium comprising from about 10 to about 60 percent by volume of combusted bark particles, about 20 to about 50 percent by volume of a fibrous organic material, about 10 to about 30 percent by volume of an expanded lightweight aggregate, and from about 1 to about 15 percent by volume of a densifying inorganic aggregate material, said combusted bark particles being the product obtained by partially combusting in a furnace essentially the bark, in particulate form, removed from logs.

14. The growing medium of claim 13 wherein said bark particles possess a dry bulk density of less than about 17 pounds per cubic foot and exhibit a particle size such that better than about 70 percent of the particles pass a No. 4 U.S. screen, but are retained on a 100 U.S. screen.

15. A growing medium especially suited for growing seeds, cuttings, plants and the like in containers, said medium comprising from about 10 to about 60 percent by volume of combusted bark particles, about 20 to about 50 percent of a fibrous organic material selected from the group consisting of peat moss and composted non-combusted bark, about 10 to about 30 percent by volume of expanded vermiculite, and from about 1 to about 15 percent by volume of a densifying inorganic aggregate having a density of at least about 50 lbs. per cubic foot, said combusted bark particles being the product recovered from the flue gases produced in a boiler furnace during the partial combustion of essentially bark removed from logs, the bark being combusted while in the form of particles of less than about 1 to 2 inches in size.

16. The method which comprises the steps of (a) providing a growing medium comprising combusted bark particles obtained as the product of partially combusting in a furnace essentially the bark, in particulate form, removed from logs; (b) placing said growing medium in a container; and (c) placing a seed or plant in said growing medium.

17. The method of claim 16 wherein said combusted bark particles possess a dry bulk density of less than about 17 pounds per cubic foot.

18. The method of claim 16 wherein said bark particles exhibit a particle size substantially such that better than about 70 percent of the particles pass a No. 4 U.S. screen, but are retained on a 100 U.S. screen.

19. The method of claim 16 wherein said partially combusted bark particles are in admixture with another, different, horticultural material of organic, inorganic or mixed organic-inorganic nature.

20. The method of claim 19 wherein the amount of said partially combusted bark particles ranges between about 10 and 80 percent by volume.

21. The method which comprises the steps of (a) providing a growing medium comprising from about 20 to about 80 percent by volume of combusted bark particles in admixture with a horticultural material selected from the group consisting of natural soils, partially or fully decayed organic matter, undecayed particulate organic matter, natural or synthetic resins in particulate form, and mixtures thereof, said bark particles being the product recovered from the flue gases produced during the partial combustion of essentially bark removed from logs, the bark being combusted while in the form of particles of less than about 1 to 2 inches in size; (b) placing said growing medium in a container, and (c) placing a seed or plant in said growing medium.

22. The method of claim 21 wherein said horticultural material is selected from the group consisting of composted, non-combusted bark; non-composted non-combusted bark; peat moss; expanded vermiculite; perlite; sand or mixtures of such.

23. The method of claim 21 wherein said growing medium comprises from about 10 to about 60 percent by volume of said combusted bark particles, about 20 to about 50 percent by volume of a fibrous organic material, about 10 to about 30 percent by volume of an expanded lightweight aggregate, and from about 1 to about 15 percent by volume of a densifying inorganic aggregate material.

24. The method of claim 21 wherein said growing medium contains a nutrient material.

25. The method of claim 23 wherein said fibrous organic material is selected from the group consisting of peat moss and composted, non-combusted bark or mixtures of such, said expanded lightweight aggregate is selected from the group consisting of expanded vermiculite and perlite and mixtures of such, and said densifying inorganic aggregate is selected from materials having a density greater than about 50 pounds per cubic foot, or mixtures of such.

* * * * *